(12) United States Patent
Cadix et al.

(10) Patent No.: US 12,180,348 B2
(45) Date of Patent: Dec. 31, 2024

(54) RHEOLOGY MODIFICATION BY POROUS GEL PARTICLES

(71) Applicant: ENERGY SOLUTIONS (US) LLC, Princeton, NJ (US)

(72) Inventors: Arnaud Cadix, Lille (FR); David James Wilson, Coye la Foret (FR)

(73) Assignee: ENERGY SOLUTIONS (US) LLC, Princeton, NJ (US)

( * ) Notice: Subject to any disclaimer, the term of this patent is extended or adjusted under 35 U.S.C. 154(b) by 814 days.

(21) Appl. No.: 17/294,659

(22) PCT Filed: Nov. 13, 2019

(86) PCT No.: PCT/EP2019/081218
§ 371 (c)(1),
(2) Date: May 17, 2021

(87) PCT Pub. No.: WO2020/099505
PCT Pub. Date: May 22, 2020

(65) Prior Publication Data
US 2022/0010086 A1    Jan. 13, 2022

(30) Foreign Application Priority Data

Nov. 16, 2018   (FR) ...................................... 1860600

(51) Int. Cl.
| | | |
|---|---|---|
| *C08J 9/08* | (2006.01) | |
| *C08F 220/56* | (2006.01) | |
| *C08F 220/58* | (2006.01) | |
| *C08J 3/12* | (2006.01) | |
| *C08J 9/00* | (2006.01) | |

(52) U.S. Cl.
CPC ............... *C08J 9/08* (2013.01); *C08F 220/56* (2013.01); *C08F 220/585* (2020.02); *C08J 3/12* (2013.01); *C08J 9/0033* (2013.01); *C08F 2800/20* (2013.01); *C08F 2810/20* (2013.01); *C08J 2201/026* (2013.01); *C08J 2203/02* (2013.01); *C08J 2205/022* (2013.01); *C08J 2333/26* (2013.01)

(58) Field of Classification Search
CPC ....... C08J 9/08; C08J 9/033; C08J 3/12; C08J 2801/026; C08J 2203/02; C08J 2205/022; C08J 2333/26; C08F 220/585; C08F 220/56; C08F 2800/20; C08F 2810/20
USPC .......................................................... 521/89
See application file for complete search history.

(56) References Cited

U.S. PATENT DOCUMENTS 9,532,940 B2 *   1/2017  Ishimori ................. C08K 5/05
2004/0224021 A1 * 11/2004  Omidian ............... C08F 251/00
                                                              521/61

FOREIGN PATENT DOCUMENTS

EP            3249001 A1 * 11/2017  ............. A61L 15/22
WO    WO-2015163523 A1 * 10/2015  ............. A61L 15/60

OTHER PUBLICATIONS

Omidian, H. et al., "Advances in superporous hydrogels" Journal of Controlled Release. vol. 102, pp. 3-12, 2005. (10 pages).
International Search Report issued in corresponding International Application No. PCT/EP2019/081218; dated Nov. 29, 2019 (3 pages).
Written Opinion of the International Searching Authority issued in corresponding International Application No. PCT/EP2019/081218 dated Dec. 9, 2019 (6 pages).

* cited by examiner

*Primary Examiner* — Michael M. Bernshteyn
(74) *Attorney, Agent, or Firm* — Osha Bergman Watanabe & Burton LLP

(57) ABSTRACT

Modification of the rheology of a liquid medium, aqueous or nonaqueous, with polymers in the form of specific particles obtained by grinding (micronizing) a porous macrogel, itself prepared by a process comprising a radical polymerization step which comprises reacting in the presence of pore formers monomers containing monomers bearing at least two ethylenic unsaturations, typically in combination with monomers bearing a single ethylenic unsaturation; a polymerization initiator; and optionally a polymerization control agent. These polymer particles keep other particles in suspension within the liquid medium, and also the stabilized suspensions are obtained.

10 Claims, No Drawings

RHEOLOGY MODIFICATION BY POROUS GEL PARTICLES

CROSS-REFERENCE TO RELATED APPLICATION

The present application is a national stage of PCT Application No. PCT/EP2019/081218 filed on Nov. 13, 2019, which is herein incorporated by reference.

TECHNICAL FIELD

The present invention relates to the field of formulations comprising solid particles in suspension in a liquid medium, and more specifically to that of keeping these solid particles in suspension over time.

BACKGROUND

There are a great many practical applications where it is desirable to keep solid particles in suspension within a liquid medium. This is the case more particularly in fields as diverse as:
- cosmetics or pharmaceuticals, where it may prove useful for example to keep fillers in dispersion (for example, fillers which have covering power and/or are capable of absorbing skin secretions and/or providing protection from UV radiation, such as particles of titanium oxide or zinc oxide, kaolin, talc or micas, calcium carbonate or bentonite) or else capsules comprising active principles which are released gradually over time
- personal care compositions (for example, shower gels comprising particles with scrub effect)
- domestic or industrial cleaning products (including, in particular, products for dish washing or floor cleaning that contain abrasive particles)
- agricultural formulations (typically suspensions of particles of active plant health ingredients, especially pesticides or fertilizers)
- petroleum extraction, where systems used include dispersions comprising proppants (support agents) for injection into fractures produced in oil-bearing rocks during fracturing operations, or else fluids employed during cementing operations.

A liquid medium in the sense of the present description is a medium comprising:
- a liquid compound, or a mixture of liquid compounds, designated hereinafter by the generic term "solvent"; and
- in general, in addition to this "solvent", at least one of the following compounds:
  - solutes, i.e., compounds in dissolved state in the solvent (salts, pH buffers, solid active principles, for example); and/or
  - polymers dissolved or dispersed in the solvent; and/or
  - surfactants dissolved or dispersed in the solvent.

The solvent of a liquid medium of this kind typically comprises water, most often as the sole solvent, or at least at 50% or more (usually at least at 80%, and even at least 90%) by mass relative to the total mass of the solvents, in which case the medium is referred to as an aqueous liquid medium.

A liquid medium of the aforesaid type, whether aqueous or not, may be employed in a variety of formulations, as a dispersing phase comprising solid particles in the dispersed state. This dispersing phase may form the sole liquid phase of the formulation, whereas in certain possible alternative embodiments it may also be a continuous phase or a phase dispersed in an emulsion (a direct, inverse, or even multiple emulsion).

The rheology of the solvent is affected to a greater or lesser extent according to the nature of the solutes and polymers. A liquid medium in the sense of the present description may therefore have a higher or lower viscosity. In certain cases, a "liquid medium" as this term is employed in the present description may take the form of a physical gel, typically when it contains a sufficiently large amount of polymers that the latter form an interpenetrating structure within the liquid. To keep solid particles in suspension within a liquid medium of the aforesaid type, especially an aqueous medium, one particular solution involves employing stable colloidal particles, although this option limits the nature of the particles that may be used (in particular it implies a small size, generally of the order of a few nanometers to a few hundred nanometers) and also prohibits the use of compounds affecting the colloidal stability (especially certain salts or surfactants).

The present invention is aimed at providing an appropriate solution for keeping particles in suspension that do not necessarily exhibit colloidal stability, and especially particles having dimensions of greater than 1 micron, or even than 10 microns.

To keep particles of this type in suspension, proposals have been made to gel the aqueous medium using, in particular, polysaccharides (xanthan gum or guars, modified or otherwise, for example) which form associative gels or else, alternatively, associative polymers which are typically block copolymers comprising a hydrophilic block with hydrophobic blocks on either side, such as those described, for example, in SPE-174210-MS (Society of Petroleum Engineers—SPE European Formation Damage Conference and Exhibition—Budapest, Jun. 3-5, 2015).

Another proposed solution, which often proves more effective than the aforesaid viscosifying agents, involves employing particles based on chemically crosslinked polymers ("microgel" particles, which are more properly "micronized macrogel" particles, typically obtained by grinding a chemically crosslinked gel which is more macroscopic ("macrogel"), obtained in the whole space of the synthesis reactor). Employed at sufficient concentration, these "microgel" particles inhibit the displacement of the solid particles within the liquid medium by steric phenomena which are generally more stabilizing than the viscosifying agents.

This being so, one of the problems experienced with microgels is the amount of material they entail, and therefore the associated costs. Schematically, in order to obtain sufficient stabilization, it is necessary to employer an amount of polymer that ensures virtually complete occupation of the interparticulate spaces. This problem is especially marked in the presence of salts, which tends to inhibit the phenomena of swelling of the microgel particles, thereby inducing a further increase in the amount of microgel needed in order to ensure the desired stabilization.

One aim of the present invention is to provide an alternative solution to the aforesaid microgel particles that procures at least similar advantages but at reduced cost and especially in the presence of salts.

SUMMARY

The present invention therefore proposes the use of specific particles as a rheological agent, similar to the above-mentioned microgel particles but obtained from a more particular macrogel, being obtained in fact by reducing to particles (micronizing) a porous macrogel obtained from the synthesis of a chemically crosslinked polymer gel during which gas bubbles have been generated, with the resulting macrogel ultimately trapping, preferably, gas bubbles with a size at most similar to the size of the micronized microgel particles, and preferably smaller in size.

Porous macrogels more or less reduced to the particle state have already been described in the past. They include, in particular, superporous hydrogels (or SPHs), which are known to be particularly effective absorbents, which makes them especially suitable for use in diapers, where their water retention properties are beneficially exploited. Further details concerning superporous hydrogels may be found in references including the paper titled "*Advances in superporous hydrogels*" in the *Journal of Controlled Release,* 102 (2005) 3-12.

The present invention employs porous macrogels like the aforesaid superporous hydrogels but in a very specific form, being reduced in fact to the state of particles typically having a mean diameter in the dry state of the order of 0.5 to 500 microns (and usually between 1 and 250 microns, for example between 5 and 100 microns), and the invention employs the resultant particles for a hitherto uncontemplated application, namely to modify the rheology of an aqueous medium and typically to keep particles, especially solid particles, in suspension therein.

More precisely, in a first aspect, the present invention provides for the use, in a typically aqueous liquid medium, of crosslinked polymer particles (p) as obtained by grinding a macrogel prepared by a process comprising a radical polymerization step (E) which comprises reacting, within a reaction medium M comprising pore formers, gas bubbles for example:
  ethylenically unsaturated monomers, containing monomers m1 bearing at least two ethylenic unsaturations;
  at least one radical polymerization initiator;
  optionally at least one radical polymerization control agent
  to modify the rheology of said liquid medium, for example to keep particles in suspension within said liquid medium.

A pore former in the sense of the present description is any compound or mixture of compounds capable of inducing the formation of a porosity in the gel formed during the polymerization of step (E). There is no limit on the nature of this pore-forming agent, and in the invention it is possible to use any pore former customary in the synthesis of porous hydrogels. The agent in question may comprise, for example, globules of a liquid compound dispersed in the form of an emulsion (or more preferably a microemulsion) within the reaction medium (in one possible embodiment, this liquid compound may be soluble in the initial reaction medium comprising the constituent monomers of the gel, but be insoluble in the gelled medium obtained after polymerization).

In one particularly advantageous embodiment, the pore formers employed in step (E) are gas bubbles, typically formed in situ from a gas-generating agent, for example $CO_2$ obtained by decomposition of a bicarbonate with an acid.

Owing to the specific use of the monomers m1 and, conjointly, of the pore formers, step (E) leads to the formation of polymeric chains crosslinked with one another covalently (due to the presence of a number of ethylenic unsaturations ($>C=C<$) in the monomers partaking in the polymerization), which form a network trapping the pore formers (typically gas bubbles). The result is a crosslinked polymer composition termed a macrogel with a porosity induced by the pore former.

Step (E) may be followed by steps of washing and/or purifying the porous macrogel obtained (including, for example, separation from the pore former if necessary, this not being so in the case of the gas bubbles). To allow grinding, the porous macrogel from step (E) and optionally from subsequent washing steps is subjected generally (but not necessarily) to complete or partial drying, conducted such as to preserve the porous structure of the microgel. In some cases at least, this drying may give rise at least to the onset of grinding. At the end of grinding, particles (p) are obtained which have the composition of the microgel. Grinding is preferably conducted so as to obtain particles (p) having an average size at least equal to the average size of the pores obtained in the macrogel during its preparation in step (C). In this way, particles (p) are obtained that have a particular morphology, bearing the imprint of the porosity existing in the macrogel from which they have arisen.

When the particles (p) are coarser than the pores of the initial macrogel, the particles (p) themselves are porous, although in practice this case is fairly infrequent. The usual preference, indeed, is for the size of the particles (p) employed in the context of the present invention to be in the micron range, typically between 500 nm and 500 microns and most often between 1 and 250 microns (for example, between 2 and 200 microns), in which case the size of the particles (p) is generally of the same order of magnitude as that of the pores present in the porous macrogel (it is often complicated—although not excluded from the scope of the invention—to generate a macrogel porosity with a pore size of less than 500 nm).

Usually, then, the particles (p) useful in the invention are not porous in the strict sense, but schematically they possess a "rugged" morphology different from the "smoother" morphology of the microgel particles proposed in the prior art. This being so, the particles (p) useful in the invention in all cases have a morphology distinct from that of the customary microgel particles, with a difference in particular in their aspect ratio.

In light in particular of this specific morphology resulting from the use of a specifically porous macrogel, the particles (p) used in the invention enable effects similar to those obtained with the more usual microgel particles (obtained from a nonporous macrogel), but more effectively: for a given mass of polymer, the rheology-modifying effect (and particularly the effect in stabilizing particles dispersed in a liquid medium) is more marked with the particles (p) useful in the invention than with conventional microgel particles, so leading very advantageously to similar effects to the microgels, at reduced cost. And to look at the advantages of the invention in another way: for a similar cost, it produces effects superior to those obtained with the conventional microgel particles.

In another aspect, the invention concerns the suspensions of particles stabilized according to the invention, more specifically the compositions comprising, in a liquid medium (typically aqueous) whose rheology is modified with crosslinked polymer particles (p) as defined above, particles (p') dispersed in said aqueous medium, said particles (p) being distinct from the particles (p). The particles (p') present in these compositions according to the invention are typically solid particles, and within said liquid medium they preferably have a mean hydrodynamic diameter of the same order of magnitude as that of the particles (p) within said liquid medium.

Various features and particular embodiments of the invention will now be described in greater detail.

DETAILED DESCRIPTION

Monomers Employed in Step (E)

The monomers employed in step (E) to synthesize the porous macrogel are ethylenically unsaturated monomers which comprise, among other possible monomers, monomers m1 of the aforesaid type, bearing at least two ethylenic unsaturations >C=C< available for radical polymerization, thereby ultimately ensuring crosslinking of the macrogel.

These monomers m1 (also called "crosslinking monomers") may typically be selected from organic compounds comprising at least two ethylenic unsaturations and at most 10 unsaturations and known to be reactive via a radical pathway. These monomers typically have two or three ethylenic unsaturations.

Monomers m1 employable thus include, in particular, acrylic, methacrylic, acrylamido, methacrylamido, vinyl ester, vinyl ether, diene, styrene, alpha-methylstyrene and allyl derivatives. These monomers may also contain functional groups other than the ethylenic unsaturations, for example hydroxyl, carboxyl, ester, amide, amino or substituted amino, mercapto, silane, epoxy or halo functions.
Suitable monomers m1 include, for example:
- divinylbenzene (DVB) and derivatives of divinylbenzene, such as for example 1,3-diisopropenylbenzene;
- methacrylates such as:
    - vinyl methacrylate;
    - methacrylic anhydride;
    - allyl methacrylate;
    - phenylene dimethacrylate;
    - glycol dimethacrylates such as ethylene glycol dimethacrylate, diethylene glycol dimethacrylate, triethylene glycol dimethacrylate, tetraethylene glycol dimethacrylate, polyethylene glycol 200 dimethacrylate, polyethylene glycol 400 dimethacrylate, butanediol 1,3-dimethacrylate, butanediol 1,4-dimethacrylate, hexanediol 1,6-dimethacrylate, dodecanediol 1,12-dimethacrylate and glycerol 1,3-dimethacrylate;
    - diurethane dimethacrylate,
    - trimethylolpropane trimethylacrylate.
- acrylates, such as for example:
    - vinyl acrylate,
    - bisphenol A epoxy diacrylate,
    - glycol diacrylates such as dipropylene glycol diacrylate, tripropylene glycol diacrylate, polyethylene glycol 600 diacrylate, ethylene glycol diacrylate, diethylene glycol diacrylate, triethylene glycol diacrylate, tetraethylene glycol diacrylate, ethoxylated neopentyl glycol diacrylate, butanediol diacrylate, hexanediol diacrylate, aliphatic urethane diacrylate, trimethylolpropane triacrylate, ethoxylated trimethylolpropane triacrylate, propoxylated trimethylolpropane triacrylate, propoxylated glycerol triacrylate,
- aliphatic urethane triacrylate,
- trimethylolpropane tetraacrylate,
- dipentaerythritol pentaacrylate.
- vinyl ethers, such as vinyl crotonate, diethylene glycol divinyl ether, butane-1,4-diol divinyl ether, triethylene glycol divinyl ether;
- allyl derivatives, including in particular diallyl phthalate, diallyldimethylammonium chloride, diallyl maleate, sodium diallyloxyacetate, diallylphenylphosphine, diallyl pyrocarbonate, diallyl succinate, N,N'-diallyltartaramide, N,N-diallyl-2,2,2-trifluoroacetamide, allyl ester of diallyloxyacetic acid, 1,3-diallylurea, triallylamine, triallyl trimesate, triallyl cyanurate, triallyl trimellitate, triallyl-1,3,5-triazine-2,4,6(1H,3H,5H)-trione.
- acrylamido derivatives, such as for example N,N'-methylenebisacrylamide, N,N'-methylenebismethacrylamide (MBA), glyoxal bisacrylamide, diacrylamidoacetic acid.
- diene monomers, such as butadiene, chloroprene and isoprene.

These multi-ethylenically unsaturated monomers may be used alone or as mixtures.

Crosslinking monomers m1 particularly suited to implementing the invention are more particularly N,N'-methylenebisacrylamide (MBA) and the PEG diacrylates and PEG dimethacrylates.

In addition to the crosslinking monomers m1, it is usually desirable (especially to ensure good mechanical strength in the porous macrogel) for the ethylenically unsaturated monomers employed in step (E) to further comprise monomers m2 (also called "structural monomers") bearing a single ethylenic unsaturation >C=C<.

These monomers m2 may advantageously be selected from:
- ethylenically unsaturated carboxylic acids, sulfonic acids and phosphonic acids, and/or derivatives thereof such as acrylic acid (AA), methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, monoethylenically unsaturated dicarboxylic acid monoesters comprising 1 to 3 and preferably 1 to 2 carbon atoms, for example monomethyl maleate, vinylsulfonic acid, (meth)allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid (AMPS), vinylphosphonic acid, α-methylvinylphosphonic acid and allylphosphonic acid, and their salts;
- esters of α,β-ethylenically unsaturated monocarboxylic and dicarboxylic acids with $C_2$-$C_3$ alkanediols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate and polyalkylene glycol (meth)acrylates;
- α,β-ethylenically unsaturated monocarboxylic acid amides and the N-alkyl and N,N-dialkyl derivatives thereof, such as acrylamide, methacrylamide, N-methyl (meth)acrylamide, N-ethyl(meth)acrylamide, N-propyl (meth)acrylamide, N,N-dimethyl(meth)acrylamide, N,N-diethyl(meth)acrylamide, morpholinyl(meth) acrylamide, and metholylacrylamide (acrylamide and N,N-dimethyl(meth)acrylamide prove to be especially advantageous);
- N-vinyl lactams and derivatives thereof, for example N-vinylpyrrolidone and N-vinylpiperidone;
- open-chain N-vinylamide compounds, for example N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide;

esters of α,β-ethylenically unsaturated monocarboxylic and dicarboxylic acids with amino alcohols, for example N,N-dimethylaminomethyl (meth)acrylate, N,N-dimethylaminoethyl (meth)acrylate, N,N-diethylaminoethyl acrylate and N,N-dimethylaminopropyl (meth)acrylate;

amides of α,β-ethylenically unsaturated monocarboxylic and dicarboxylic acids with diamines comprising at least one primary or secondary amino group, such as N-[2-(dimethylamino)ethyl]acrylamide, N-[2-(dimethylamino)ethyl]methacrylamide, N-[3-(dimethylamino)propyl]acrylamide and N-[3-(dimethylamino)propyl]methacrylamide;

nitrogenous heterocycles substituted with vinyl and allyl, for example N-vinylimidazole, N-vinyl-2-methylimidazole, heteroaromatic compounds substituted with vinyl and allyl, for example 2- and 4-vinylpyridine, 2- and 4-allylpyridine, and salts thereof;

acrylamidosulfobetaines;

vinylaromatic monomers such as styrene, alpha-methylstyrene, para-chloromethylstyrene, vinyltoluene, 2-methylstyrene, 4-methylstyrene, 2-(n-butyl)styrene, 4-(n-decyl)styrene and 2-(tert-butyl)styrene;

halogenated vinyl compounds, such as vinyl or vinylidene halides, for example vinyl or vinylidene chlorides or fluorides, corresponding to the formula $R_bR_cC=CX^1X^2$, where:
$X^1$=F or Cl
$X^2$=H, F or Cl
each one of $R_b$ and $R_c$ represents, independently:
H, Cl, F; or
an alkyl group, preferably chlorinated and/or fluorinated, more advantageously perchlorinated or perfluorinated;

esters of an α,β-ethylenically unsaturated monocarboxylic or dicarboxylic acid with $C_2$-$C_{30}$ alkanols, for example methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachidyl (meth)acrylate, behenyl (meth)acrylate, lignoceryl (meth)acrylate, cerotinyl (meth)acrylate, melissinyl (meth)acrylate, palmitoleoyl (meth)acrylate, oleyl (meth)acrylate, linoleyl (meth)acrylate, linolenyl (meth)acrylate, stearyl (meth)acrylate, lauryl (meth)acrylate and mixtures thereof;

esters of vinyl or allyl alcohol with $C_1$-$C_{30}$ monocarboxylic acids, for example vinyl formate, vinyl acetate, vinyl propionate, vinyl butyrate, vinyl laurate, vinyl stearate, vinyl propionate, vinyl versatate and mixtures thereof;

ethylenically unsaturated nitriles, such as acrylonitrile, methacrylonitrile, and mixtures thereof;

esters of α,β-ethylenically unsaturated monocarboxylic and dicarboxylic acids with $C_3$-$C_{30}$ alkanediols, for example 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate and 3-hydroxy-2-ethylhexyl methacrylate;

primary amides of α,β-ethylenically unsaturated monocarboxylic and dicarboxylic acids and N-alkyl and N,N-dialkyl derivatives, such as N-propyl(meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl(meth)acrylamide, N-arachidyl(meth)acrylamide, N-behenyl(meth)acrylamide, N-lignoceryl(meth)acrylamide, N-cerotinyl(meth)acrylamide, N-melissinyl(meth)acrylamide, N-palmitoleoyl (meth)acrylamide, N-oleyl(meth)acrylamide, N-linoleyl(meth)acrylamide, N-linolenyl(meth)acrylamide, N-stearyl(meth)acrylamide and N-lauryl(meth)acrylamide;

N-vinyl lactams and derivatives thereof, such as N-vinyl-5-ethyl-2-pyrrolidone, N-vinyl-6-methyl-2-piperidone, N-vinyl-6-ethyl-2-piperidone, N-vinyl-7-methyl-2-caprolactam and N-vinyl-7-ethyl-2-caprolactam;

esters of α,β-ethylenically unsaturated monocarboxylic and dicarboxylic acids with amino alcohols, for example N,N-dimethylaminocyclohexyl (meth)acrylate;

amides of α,β-ethylenically unsaturated monocarboxylic and dicarboxylic acids with diamines comprising at least one primary or secondary amino group, for example N-[4-(dimethylamino)butyl](meth)acrylamide and N-[4-(dimethylamino)cyclohexyl]methacrylamide; and the mixtures and combinations of two or more of the abovementioned monomers.

The monomers m2 may typically be selected from N,N-dimethylacrylamide (DMA), 2-acrylamido-2-methylpropanesulfonic acid (AMPS), acrylic acid (AA), acrylamide (AM), and mixtures thereof.

Whatever the precise nature of the monomers m1 and m2, the mass ratio m1/m2 of the total mass of the crosslinking monomers m1 employed in step (E) relative to the total mass of the monomers of structure m2 employed in step (E) is preferably between 0.01 and 30 typically between 0.1 and 10.

Polymerization Initiators

The polymerization initiator employed in step (E) is preferably soluble in the reaction medium M. Apart from this preferential condition, it is possible to employ any radical polymerization initiator (source of free radicals) known per se and suitable for the conditions selected for step (E), especially the presence of pore formers or the formation in situ of pore formers (more particularly when they are gas bubbles).

Thus, the radical polymerization initiator employed according to the invention may be selected, for example, from the following initiators list to be validated/restricted:

hydrogen peroxides such as: $H_2O_2$; tert-butyl hydroperoxide; cumene hydroperoxide persulfates such as potassium persulfate, ammonium persulfate and sodium persulfate, azo compounds, such as: 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl)propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide], 2,2'-azobis(isobutyramide) dihydrate, redox systems comprising combinations, such as:

mixtures of hydrogen peroxide, alkyl peroxide, peresters, percarbonates and the like and of any of the iron salts, titanous salts, zinc formaldehyde sulfoxylate or sodium formaldehyde sulfoxylate, and reducing sugars, and alkali metal or ammonium persulfates, perborates or perchlorates in combination with an alkali metal bisulfite, such as sodium metabisulfite, or sodium formaldehyde sulfoxylate and reducing sugars.

It generally proves advantageous to use a radical initiator of redox type, which has advantages including not requiring heating of the reaction medium (no thermal initiation). It is typically a mixture of at least one oxidizing agent with at least one reducing agent.

The oxidizing agent present in this redox system is preferably a water-soluble agent. This oxidizing agent may, for example, be selected from peroxides, such as:

hydrogen peroxide and tert-butyl hydroperoxide;

sodium persulfate, potassium persulfate or ammonium persulfate, or else potassium or sodium bromate.

The reducing agent present in the redox system is also preferably a water-soluble agent. This reducing agent may typically be selected from sodium formaldehyde sulfoxylate (in particular in its dihydrate form, known under the name Rongalit, or in the form of an anhydride), ascorbic acid, erythorbic acid, sulfites, bisulfites or metasulfites (more particularly alkali metal sulfites, bisulfites or metasulfites), nitrilotrispropionamides, and tertiary amines and ethanolamines (which are preferably water-soluble).

Possible redox systems comprise combinations such as:

mixtures of water-soluble persulfates with water-soluble tertiary amines, mixtures of water-soluble bromates (for example, alkali metal bromates) with water-soluble sulfites (for example, alkali metal sulfites), mixtures of hydrogen peroxide, alkyl peroxide, peresters, percarbonates and the like and of any of the iron salts, titanous salts, zinc formaldehyde sulfoxylate or sodium formaldehyde sulfoxylate, an alkali metal bisulfite such as, for example, sodium metabisulfite, and reducing sugars, alkali metal or ammonium persulfates, perborates or perchlorates in combination with an alkali metal bisulfite, such as sodium metabisulfite, and reducing sugars.

An advantageous redox system comprises (and preferably consists of) the combination of ammonium or sodium or potassium persulfate and tetramethylenediamine (TMEDA).

The pore formers employed in step (E) are typically $CO_2$ bubbles formed by reaction of a bicarbonate (especially sodium bicarbonate) with an acidic compound present in the reaction medium (acidic compounds may be added deliberately, such as acetic acid, for example, or else, alternatively, acid-type monomers fulfilling this role may be employed, such as for example acrylic acid, which may be used as a structural monomer m2). In that case, the bicarbonate is preferably added after the polymerization of step (E) has started: this is because adding the bicarbonate induces an increase in the pH which usually causes accelerated decomposition of the polymerization initiator. In practice, therefore, it is advantageous to contact the monomers and the initiators until the medium starts to viscosify, and only then to introduce the bicarbonate which will induce the formation of bubbles, which will be trapped when the polymerization continues.

In that particular case, step (E) preferably first comprises a step (E1) in which only a part of the ethylenically unsaturated monomers are polymerized in the absence of pore formers, then a step (E2) in which the polymerization is continued with introduction of the pore formers.

Possible Control of the Radical Polymerization in Step (E)

According to one preferred embodiment, step (E) is specifically a controlled radical polymerization, conducted in the presence of a radical polymerization control agent.

Within the meaning of the present description, the term "radical polymerization control agent" (or more simply "control agent") is understood to mean a compound capable of lengthening the lifetime of the growing polymer chains in a polymerization reaction and, preferably, of conferring on the polymerization a living or controlled character.

When a radical polymerization control agent of the aforesaid type is used, it proves possible in particular to control the length of the polymer chains obtained at the end of step (E) and to ensure that the growing chains are of substantially similar size: by abstracting from the presence of the crosslinks associated with the use of the monomers m1, the resulting macrogel comprises substantially similar chains with a size regulated by the amount of control agent used (for a given amount of monomers, the average length of the chains goes down as the amount of control agent goes up). These chains are crosslinked with one another by virtue of the use of the monomers m1, the amount of which, incidentally, dictates the degree of crosslinking of the resulting gel. In this way the structure of the porous macrogel (and hence some of its properties, such as for example its mechanical strength) may be finely controlled and a more homogeneous composition obtained within the macrogel.

The control agent which may advantageously be employed in step (E) is preferably a compound bearing a thiocarbonylthio —S(C=S)— group. According to one particular embodiment, the control agent may bear a plurality of thiocarbonylthio groups. It may optionally be a polymer chain carrying such a group.

Thus, this control agent may, for example, correspond to the formula (A) below:

(A)

in which:

Z represents:
a hydrogen atom,
a chlorine atom,
an optionally substituted alkyl or optionally substituted aryl radical,
an optionally substituted heterocycle,
an optionally substituted alkylthio radical,
an optionally substituted arylthio radical, an optionally substituted alkoxy radical,
an optionally substituted aryloxy radical,
an optionally substituted amino radical,
an optionally substituted hydrazinyl radical,
an optionally substituted alkoxycarbonyl radical,
an optionally substituted aryloxycarbonyl radical,
an optionally substituted acyloxy or carboxyl radical,
an optionally substituted aroyloxy radical,
an optionally substituted carbamoyl radical,
a cyano radical,
a dialkyl- or diarylphosphonato radical,
a dialkyl-phosphinato or diaryl-phosphinato radical, or
a polymer chain,
and
$R_1$ represents:
an optionally substituted alkyl, acyl, aryl, aralkyl, alkene or alkyne group,
a saturated or unsaturated, aromatic, optionally substituted, carbocycle or heterocycle, or
a polymer chain, which is preferably hydrophilic or water-dispersible when the agent is used in step (E).

The groups $R_1$ or Z, when they are substituted, may be substituted with optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acyloxy (—$O_2$CR), carbamoyl (—$CONR_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—$NR_2$), halogen, perfluoroalkyl $C_nF_{2n+1}$, allyl, epoxy, alkoxy (—OR), S-alkyl, S-aryl, groups having hydrophilic or ionic character, such as alkali metal salts of carboxylic acids, alkali metal salts of sulfonic acid, polyalkylene oxide (PEO, PPO) chains, cationic substituents (quaternary ammonium salts), R representing an alkyl or aryl group, or a polymer chain.

For the control agents of formula (A) used in step (E), it is generally preferred for the group R1 to be of hydrophilic nature. Advantageously, it is a water-soluble or water-dispersible polymer chain.

The group $R_1$ may alternatively be amphiphilic, meaning that it may exhibit both hydrophilic and lipophilic character. It is preferable for $R_1$ not to be hydrophobic.

As regards the control agents of formula (A) used in step ($E^0$), $R_1$ may typically be a substituted or unsubstituted, preferably substituted, alkyl group. A control agent of formula (A) used in step ($E^0$) may nevertheless comprise other types of groups $R_1$, in particular a ring or a polymer chain.

The optionally substituted alkyl, acyl, aryl, aralkyl or alkyne groups generally have 1 to 20 carbon atoms, preferably 1 to 12 and more preferentially 1 to 9 carbon atoms. They may be linear or branched. They may also be substituted by oxygen atoms, in the form in particular of esters, sulfur atoms or nitrogen atoms.

Mention may in particular be made, among the alkyl radicals, of the methyl, ethyl, propyl, butyl, pentyl, isopropyl, tert-butyl, hexyl, octyl, decyl or dodecyl radical.

The alkynyl groups are radicals generally of 2 to 10 carbon atoms; they exhibit at least one acetylenic unsaturation, such as the acetylenyl radical.

The acyl group is a radical generally exhibiting from 1 to 20 carbon atoms with a carbonyl group.

Mention may in particular be made, among the aryl radicals, of the phenyl radical, which is optionally substituted, in particular by a nitro or hydroxyl functional group.

Mention may in particular be made, among the aralkyl radicals, of the benzyl or phenethyl radical, which is optionally substituted, in particular by a nitro or hydroxyl functional group.

When $R_1$ or Z is a polymer chain, this polymer chain may result from a radical or ionic polymerization or result from a polycondensation.

Advantageously, compounds bearing a xanthate —S(C═S)O—, trithiocarbonate, dithiocarbamate or dithiocarbazate function, for example bearing an O-ethyl xanthate function of formula —S(C═S)$OCH_2CH_3$, are used as a control agent for step (E).

Xanthates prove to be especially advantageous, in particular those bearing an O-ethyl xanthate —S(C═S)$OCH_2CH_3$ function, such as O-ethyl S-(1-methoxycarbonylethyl) xanthate ($CH_3CH(CO_2CH_3$))S(C═S)OEt. Another possible control agent in step)($E^0$ is dibenzyl trithiocarbonate of formula $PhCH_2S$(C═S)$SCH_2Ph$ (where Ph=phenyl).

Preparation of Particles (p) from the Porous Macrogel

The conversion of the macrogel into smaller particles (a step designated by the generic term "grinding" in the present description) may be realized in particular using the traditional grinding and drying means known to a person skilled in the art. By way of example, mention may be made of the technique of drying in a fluid bed and grinding by means of pin mills, hammer mills, ball mills, and air jet grinding. These techniques may be carried out according to the cryogrinding mode.

Whichever grinding mode is used, the particles (p) preferably have dimensions of more than 500 nm, and even than 1 micron, typically less than 200 μm, more preferably less than 100 microns, for example of between 500 nm and 50 microns, in particular between 1 and 20 microns.

Use of the Particles (p)

The particles (p) may be employed to modify the rheology of multiple liquid media in the sense of the present description. They are useful more particularly for modifying the rheology of aqueous liquid media, comprising water and possible water-miscible cosolvents (alcohol for example) with a mass water/(water+cosolvent) ratio of preferably more than 50%, or even more than 80%, in particular more than 90% or more than 95%, and even than 98% by mass. According to one embodiment, the modified liquid medium according to the invention contains water as sole solvent.

One particularly advantageous application of the particles (p) is their use to keep particles (p') in suspension within the aforesaid liquid medium. The particles (p') are preferably solid, organic or inorganic particles. They may in particular comprise the particles listed in the introductory part of the present description. Especially when the particles (p) have the abovementioned preferred dimensions, the particles (p') typically have dimensions of between 5 and 50 microns.

Various aspects and advantages of the invention will be further illustrated by the illustrative example given hereinafter.

EXAMPLES

Particles p useful according to the invention were prepared by grinding a porous macrogel prepared under the conditions set out below.

Compounds Employed

The compounds employed for the synthesis of the porous macrogel are listed in table 1 below, which likewise indicates, in the far right-hand column, the mass employed for the synthesis of each product. The starting products are mostly available commercial products in dilution in water, except for dimethylacrylamide DMA, Pluronic F127 and acetic acid. Where appropriate, the table reports the concentration of compound in the aqueous composition employed, the mass of composition employed, and the effective mass of product employed in the synthesis (mass of active ingredient).

TABLE 1

Products employed to synthesize the porous macrogel

| Compound | mass of the composition comprising the compound | Concentration of compound in the composition | mass of compound employed (g) |
|---|---|---|---|
| Dimethylacrylamide (DMA) | — | — | 7.5 |
| Acrylamidomethylpropylsulfonic acid, sodium salt (AMPS) | 34.7 | 50% | 17.3 |
| Acrylamide (Am) | 32.3 | 50% | 16.1 |
| Methylenebisacrylamide (MBA) | 9.3 | 3% | 0.2 |
| Pluronic F127 | — | — | 1.2 |
| Acetic acid | — | — | 3.4 |
| Ammonium persulfate (NH4PS) | 1.9 | 20% | 0.4 |
| Tetramethylethylenediamine (TMEDA) | 2.0 | 20% | 0.4 |
| Sodium bicarbonate (NaHCO3) | 69.1 | 9% | 6.2 |

Synthesis of the Porous Macrogel

The entirety of the DMA, AMPS, Am, MBA and Pluronic F127 (employed in the form of the aforesaid aqueous compositions in the case of the AMPS, Am and MBA) were introduced into a suitably sized beaker. The mixture was then stirred until the Pluronic F127 was fully dissolved. The pH was then adjusted to pH=4 with acetic acid. The resulting solution was transferred to a 3 L Dewar flask and stirred using a half-moon stirrer. After 1 minute, stirring with the stirrer was halted and the solution of NH4PS was injected into the medium using a syringe fitted with a needle. A few seconds later, the solution of TMEDA was injected. About 20 seconds later, the solution of NaHCO$_3$ was injected in turn. A foam formed immediately and an expansion in volume (about 15 fold) was observed. This volume expansion was accompanied by polymerization of the monomers, leading to the porous macrogel being obtained after 6 hours of reaction.

Preparation of the Particles p

The porous macrogel was carefully removed from the Dewar, and the top and bottom portions of the macrogel, which are heterogeneous, were cut off and discarded. The rest of the porous macrogel was cut up into small cubes, which were then placed in a 250 mL wide-neck polyethylene container. The unoccupied volume of the container was then filled up with ethanol, after which the container was left to stand for 8 hours, when the ethanol was poured off and replaced with fresh ethanol. After a further 12 hours, the ethanol was again poured off and the cubes of porous macrogel were dried in the air for 2 hours, then for 24 h in an oven at 50° C.

The cubes obtained were preground with a pestle in a mortar, and then underwent more in-depth grinding using a coffee grinder (Moulinex AR110510). The powder from this grinding was sieved using a 250 micron sieve. The particles p of this example (which underwent the rheological test described below) correspond to the sieved powder and have a size of not more than 250 microns.

Comparative particles p' (Control) were prepared from a macrogel prepared using exactly the same protocol as described for the particles p, the only difference being that the solution of sodium bicarbonate NaHCO$_3$ was not added: it was replaced with the same mass (i.e., 69.1 g) of distilled water.

The non-porous macrogel thus prepared in the absence of pore formers (corresponding to the conventional protocol for preparing prior-art microgel particles) was cut up then into small cubes, dried and ground under the same conditions as described for the porous macrogel, to give the particles p'.

Different compositions were made by introducing particles (p or p' as selected) into a 2% aqueous KCl solution at 25° C., with different concentrations of particles (expressed as the mass of polymer relative to the total mass of the composition), and the viscosity of the resulting composition was measured using an AR-G2 imposed-stress rheometer supplied by TA Instruments. The geometry used is a helical, Couette-type geometry which allows the rheological properties to be measured on suspensions without risk of artefacts linked to bridging events between the rotor and stator in the geometry.

The rheograms of stress as a function of shear obtained for each of the compositions are interpreted using a Bingham model, awarding each test composition a yield point and a flow viscosity. The yield point can be correlated directly with the capacity of the microgel suspension to suspend particles. A higher viscosity implies, in accordance with Stokes' law, a slowing of the settling or creaming of the particles in suspension in the slurry.

The results obtained for each of the compositions are reported in table 2 below, which illustrates the superiority of the particles according to the invention relative to the microgel particles of the prior art, namely that at equivalent mass, the particles (p) according to the invention have a massively more marked effect on the rheology than the control particles.

TABLE 2

Results obtained

| Concentration of particles in the composition (% by mass) | Particles p' Control | | Particles p Inventive | |
|---|---|---|---|---|
| | yield point (Pa) | flow viscosity (mPa · s) | yield point (Pa) | flow viscosity (mPa · s) |
| 2.5% | 0.02 | 15 | 0.7 | 180 |
| 4% | 0.02 | 30 | 60 | 1800 |

The invention claimed is:

1. A method comprising adding crosslinked polymer particles (p) to a liquid medium, the crosslinked polymer particles (p) obtained by grinding a macrogel prepared by a process comprising a radical polymerization step (E) which comprises reacting, within a reaction medium M comprising pore formers:
- ethylenically unsaturated monomers, containing monomers m1 bearing at least two ethylenic unsaturations;
- at least one radical polymerization initiator;
- optionally at least one radical polymerization control agent
- to modify the rheology of said liquid medium, wherein:
- the crosslinked polymer particles (p) have in a dry state, an average diameter ranging between 0.5 to 250 microns when measured using a sieve; and
- the macrogel has an average pore size greater than or equal to 500 nm.

2. The method as claimed in claim 1, wherein the monomers employed in step (E) further comprise monomers m2 bearing a single ethylenic unsaturation.

3. The method as claimed in claim 1, wherein the liquid medium is an aqueous liquid medium.

4. The method as claimed in claim 1, wherein particles are kept in suspension within the liquid medium.

5. The method as claimed in claim 1, wherein the pore formers employed in step (E) are gas bubbles.

6. The method as claimed in claim 1, wherein step (E) first comprises a step (E1) in which only a part of the ethylenically unsaturated monomers are polymerized in the absence of pore formers, then a step (E2) in which the polymerization is continued with introduction of the pore formers.

7. The method as claimed in claim 1, wherein step (E) is a controlled radical polymerization conducted in the presence of a radical polymerization control agent.

8. The method as claimed in claim 5, wherein the pore formers employed in step (E) are $CO_2$ bubbles formed by reaction of a bicarbonate with an acidic compound present in the reaction medium.

9. The method as claimed in claim 7, wherein the radical polymerization control agent is a compound bearing a thiocarbonylthio group —S(C=S)—.

10. The method as claimed in claim 2, wherein the mass ratio m1/m2 is between 0.01 and 30.

* * * * *